May 29, 1973  KAZUYOSHI NAGAO  3,736,217

LIGHT-CONDUCTING FIBER MATERIAL

Original Filed Sept. 29, 1969

INVENTOR
KAZUYOSHI NAGAO

United States Patent Office 3,736,217
Patented May 29, 1973

3,736,217
LIGHT-CONDUCTING FIBER MATERIAL
Kazuyoshi Nagao, Yokohama, Japan, assignor to American Optical Corporation, Southbridge, Mass.
Original application Sept. 29, 1969, Ser. No. 861,871, now Patent No. 3,666,587. Divided and this application Jan. 28, 1971, Ser. No. 110,757
Int. Cl. B32b 3/00
U.S. Cl. 161—143
3 Claims

ABSTRACT OF THE DISCLOSURE

Plastic light-conducting fiber ribbons are formed of a transparent high refractive index strip of plastic material covered with thin films of relatively low refractive index plastic material. The covered strip is heated and rolled to the configuration of a multiplicity of interconnected juxtaposed fibers from which monofilaments may be cut longitudinally of the ribbon.

---

This is a division of application Ser. No. 861,871 filed Sept. 29, 1969, now Pat. No. 3,666,587.

BACKGROUND OF THE INVENTION

Field of the invention

Fiber optics with particular reference to individually clad light-conducting fibers formed of rolled plastic materials.

Description of the prior art

Current demands for optical fiber are accompanied by requirements for greater fiber flexibility and lower production cost. The glass optical fiber being relatively expensive to manufacture and also having the inherent drawback of being fragile has prompted the use of extruded plastic fibers. High temperatures required for extrusion, however, tend to carbonize plastic fiber materials and impair their optical quality.

Accordingly, it is an object of this invention to provide for the manufacture of highly flexible plastic fibers with accurate and rapid reproducibility and a minimum of impairment of optical quality through the use of low plastic-forming temperatures.

SUMMARY OF THE INVENTION

According to the present invention a strip of transparent plastic material having a high refractive index is covered by thin films of low refractive index plastic material and rolled at a minimum softening temperature longitudinally into the configuration of a ribbon of juxtaposed fiber elements from which monofilaments may be formed by cutting long lines of division between the fiber elements.

Details of the present inventive concept will be more fully understood by reference to the following description when taken in conjunction with the accompanying drawing.

DESCRIPTION OF THE PREFERRED EMBODIMENTS

Figure 1:
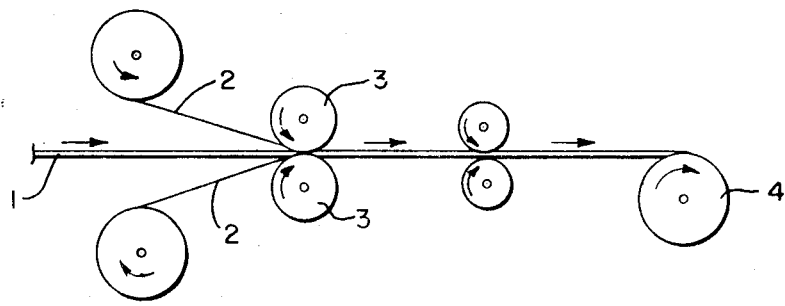
FIG. 1 is a schematic illustration of a system for forming fiber optical components according to the present inventive concept.

In the optical fiber forming system illustrated by FIG. 1, fiber core material 1 in the form of a strip of plastic material such as polystyrene resin is directed through a pair of shaping rollers 3 between thin films 2 of, for example, an acrylic resin. Rollers 3 are heated to a temperature substantially no greater than that required for softening core material 1 and films 2 sufficiently to permit shaping thereof by rollers 3 and fusion of the films to core material 1. The resulting multifiber ribbon is directed from rollers 3 onto winding drum 4 for storage.

Figure 2:
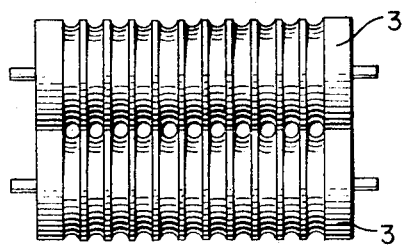
FIG. 2 is an elevational view of one type of plastic forming rollers useful in the system of FIG. 1.
Figure 3:
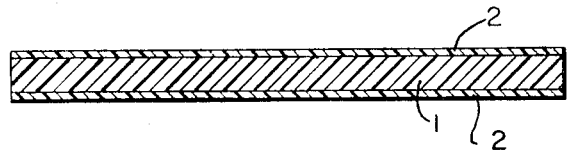
FIG. 3 is a cross-sectional view of a strip of plastic material used in the system of FIG. 1, the illustration being exemplary of the cross-sectional configuration of the material immediately prior to rolling thereof.

Immediately prior to entering rollers 3, core material 1 and films 2 appear substantially as illustrated in FIG. 3. In passing through rollers 3 of the type illustrated in FIG. 2, the materials are formed to a cross-sectional shape resembling that shown in FIG. 4 wherein the core material 1 is segregated into fiber elements each completely surrounded by the materials of films 2. The relatively low refractive index of films 2 renders each separated portion of core material 1 highly conductive to light by the principles of total internal reflection and useful as a light-conducting fiber.

Figure 5:
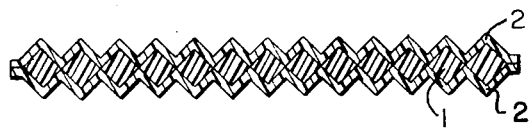
FIG. 5 is a cross-sectional view of a strip of plastic material of a different cross-sectional configuration which may be produced according to the present inventive concept.

A multifiber ribbon having a rectilineal cross-sectional configuration is illustrated in FIG. 5. Such a ribbon is formed simply by using rollers 3 which are provided with a series of mated circumferential grooves each having the configuration of corresponding opposite side surfaces of the multifiber ribbon shown in FIG. 5.

Figure 6:
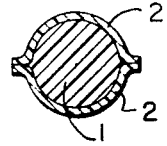
FIGS. 6 and 7 are enlarged cross-sectional views of light-conducting monofilaments which may be cut from plastic strips of the types illustrated in FIGS. 4 and 5.
Figure 4:
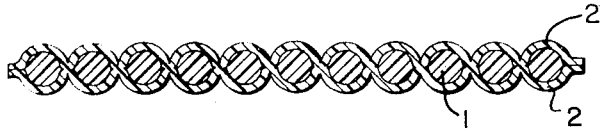
FIG. 4 illustrates one cross-sectional configuration which may be imparted to strips of plastic material according to the present inventive concept.
Figure 7:
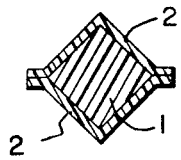

Multifiber bundles may be formed by stacking and fusing or cementing together a preselected number of ribbons such as those illustrated in FIGS. 4 or 5. Alternatively, monofilaments such as are illustrated in FIGS. 6 and 7 may be cut from correspondingly shaped fiber ribbons.

In the manufacture of fiber optical image transmitting devices, conventional glass optical fibers are fragile and difficult to handle while the present form of optical fiber, having exceptional flexibility, will readily conform to sinuous shapes such as are encountered in the manufacture of circle-to-line-converters, for example.

I claim:

1. A ribbon of juxtaposed plastic fibers comprising a plurality of fiber cores of high refractive index disposed in spaced parallel side-by-side relationship with each other, a film of lower refractive index covering material extending over each of opposite sides of said plurality of cores, said films being joined together along lines extending longitudinally between said cores and fused to said cores.

2. Plastic fibers according to claim 1 separated from one another along said lines between said cores.

3. Plastic fibers according to claim 1 wherein said high refractive index material is a polystyrene resin and said lower refractive index material is an acrylic resin.

References Cited

UNITED STATES PATENTS

| | | | |
|---|---|---|---|
| 3,588,221 | 6/1971 | Siegmund | 350—96 B |
| 3,653,739 | 4/1972 | Strach | 350—96 B |
| 3,624,385 | 11/1971 | Wall | 350—96 B |
| 3,610,726 | 10/1971 | Aijala | 350—96 B |

FOREIGN PATENTS

| | | | |
|---|---|---|---|
| 1,037,498 | 7/1966 | Great Britain | 350—96 |

GEORGE F. LESMES, Primary Examiner

J. J. BELL, Assistant Examiner

U.S. Cl. X.R.

161—166, 170, 176; 350—96 B